Dec. 12, 1961 — L. C. BIXBY — 3,012,766
HEAT TREATING BASKET
Filed Oct. 2, 1958
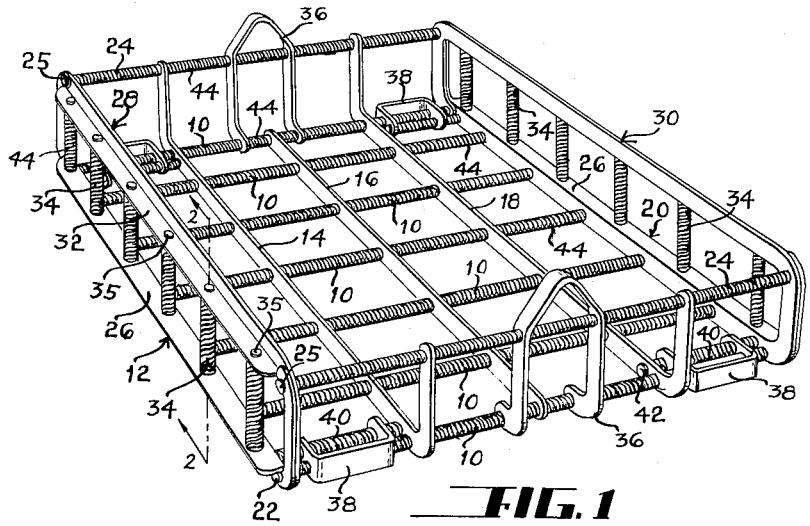
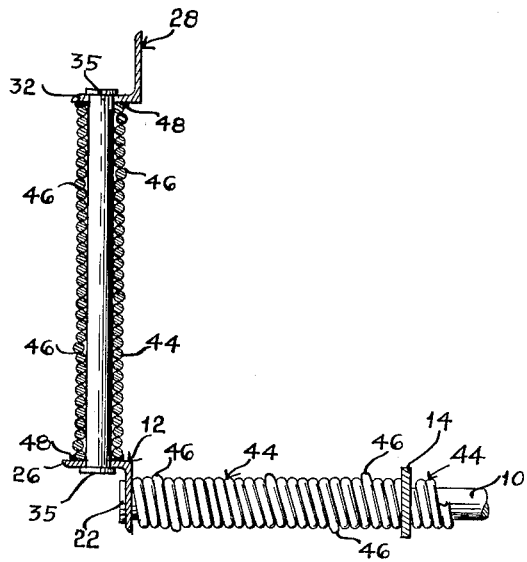
INVENTOR.
LEON C. BIXBY
BY
HIS ATTORNEYS

United States Patent Office 3,012,766
Patented Dec. 12, 1961

3,012,766
HEAT TREATING BASKET
Leon C. Bixby, Wellington, Ohio, assignor to Bix Company, Wellington, Ohio, a partnership
Filed Oct. 2, 1958, Ser. No. 764,965
3 Claims. (Cl. 263—47)

This invention relates to a basket and more particularly to a metal basket constructed for use as a heat treat basket, however, the invention is not necessarily so limited.

Baskets which are used in heat treating operations are periodically subjected to high temperatures then low temperatures. Conventionally, the baskets are metal and, in consequence of the periodic heating and cooling of the baskets, the metallic parts expand and contract. Such repeated expansion and contraction tends to weaken and eventually destroy rivets and welded seams which may be employed in assembling the basket.

An object of this invention is to provide a metallic basket which is assembled without the use of welds or rivets or the like, yet which is sturdy and capable of maintaining its shape without undue stress or distortion over a wide range of temperatures.

Another object of this invention is to provide a basket construction embodying a lattice of intersecting slidably joined metallic elements, and spacers for spacing the lattice elements in parallel relation, wherein the spacers are constructed to yield under stresses such as may be created by differential thermal expansion of the lattice elements.

Other objects and advantages reside in the construction of parts, the combination thereof, the method of manufacture and the mode of operation, as will become more apparent from the following description.

In the drawing,

FIGURE 1 is a perspective view of an embodiment of this invention.

FIGURE 2 is an enlarged fragmentary sectional view taken substantially along the line 2—2 of FIGURE 1.

Referring to the drawing in detail, the basket of FIGURE 1 is provided with a base or bottom formed of a plurality of spaced parallel tie rods 10. Transverse to these rods are spaced parallel frame members 12, 14, 16, 18 and 20. Each of these frame members is provided with spaced apertures slidably receiving the rods 10. With the rods 10 slidably passed through the apertures in the frame members a loose rectangular lattice structure is obtained. The frame members are secured against removal from the rods 10 through the provision of upset heads 22 on the ends of these rods.

The frame members 12, 14, 18, and 20 have their opposite ends turned upwardly to support transverse rods 24. These rods 24 cooperate with the upwardly turned ends of the frame members 12, 14, 18, and 20 to form ends for the basket. As with the rods 10, the ends 25 of the rods 24 are upset.

The frame members 12 and 20 are disposed at the opposite ends of the rods 10. These frame members are constructed from angle bars in such a manner that outwardly projecting flanges 26 are provided on these frame members. These flanges are provided with spaced apertures for receiving upright rods 34, there being a plurality of rods 34 on each side of the basket. The upper ends of the rods 34 on either side of the basket are engaged by frame members 28 and 30, each having an outwardly projecting flange 32. The flanges 32 are provided with spaced apertures for receipt of the ends of the rods 34. The opposite ends 35 of the rods 34 are upset so as to prevent separation of the frame members therefrom.

The opposite ends of the frame members 28 and 30 are turned downwardly and provided with suitable apertures for receipt of the rods 10 and 24 at the opposite ends of the basket. Through this construction the frame members 12, 20, 28, and 30 cooperate with the upright rods 34 to form side walls for the basket.

The rods 10 and 24 at the extreme ends of the basket cooperate to support generally U-shaped handles 36 slidably mounted thereon. There is one handle 36 at each end of the basket disposed in straddling relation to the frame member 16 in the base of the basket.

The rods 10 at the extreme ends of the base of the basket also slidably support U-shaped brackets 38, there being one bracket 38 disposed in each corner of the basket adjacent the frame members 12 and 20. These brackets 38 are secured against rotation on the rods 10 by means of rods 40 extending parallel to the rods 10 through apertures in the legs of the brackets 38 and through the frame members 12 and 14 on one side of the basket, and 18 and 20 on the other side of the basket. As is the case with the rods 10, 24 and 34 the rods 40 have upset ends 42.

The brackets 38 adapt the basket for engagement with conveyors used in conventional heat treat ovens.

Since all of the frame members, the handles 36 and the brackets 38 are slidably secured to the rods 10, 24, 34, and 40, the basket, as thus far described, is incapable of retaining its shape. The shape of the basket is fixed by encircling the rods employed in the basket with coiled wire elements 44 which serve as spacers in the lattice assembly forming the basket. As illustrated at 48 in FIGURE 2, the opposite ends of the elements 44 are welded to the frame members which they abut. This is the case throughout the basket. With reference to FIGURE 1, coiled wire elements 44 encircle all exposed portions of the rods 10, 24, 34, and 40 with the result that all looseness in the basket is taken up. Preferably, the coils are tightly wound so that there is little or no clearance for compression of the coils, thus producing a basket structure which is substantially rigid.

Upon heating of the basket, all elements undergo thermal expansion. The individual wire strands which form the coiled wire elements will expand both in diameter and in length. Since the ends of these wire strands are welded to the frame members of the basket, the expansion in length will become manifest through an increase in the diameter of the convolutions of the elements 44. Correspondingly, the increase in diameter of the individual wire strands will become manifest through an increase in the length of the element 44.

A differential in the lengthwise thermal expansion of the rods 10, 24, 34, and 40 as compared to the coiled wire elements 44 may lead to either an expansion or a compression of some or all of the coiled wire elements 44. The elements 44 are, of course, free to expand as a spring. Due to the close winding of these coiled wire elements, however, they can undergo only limited contraction as a spring. Further contraction in length is provided by a different mechanism as described in the following.

There is a lack of precision in all coiling or winding processes. Preferably, the coiled wire elements 44 are formed with a minimum of precision. Such lack of precision is illustrated in FIGURE 2 by humps 46 in the coiled wire elements 44. These humps, which are somewhat exaggerated in size, illustrate erratic alignment between adjacent convolutions of the coiled wire elements such as will permit one convolution to squeeze partially under an adjacent convolution when the coiled wire element is subjected to axial compression. Clearly, any misalignment in the coiled wire elements 44 at room temperature will be enhanced by thermal expansion at elevated temperatures.

Thus, random misalignment in the coiled wire elements 44 arising from a lack of precision in their manufacture provides a mechanism for contraction of the wire elements on thermal expansion of the basket formed therewith should such become necessary.

It is to be understood that variations in the composition and shape of the parts employed in a given basket make it impossible to predict in advance which, if any, of the coiled wire elements will be subjected to expansion or compression on heating. Since the coiled wire elements 44 will accommodate either an expansion or a compression, however, these factors become unimportant, the basket will remain substantially rigid without undue stress at any point throughout a wide range of temperatures.

While the coiled wire elements 44 in the basket are described as having their ends welded to the frame members, it is to be understood that for some purposes it may be desirable to omit the weld at these points thereby producing an entirely weld free basket.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A metallic basket for use in heat treating operations in which the basket is periodically subjected to high temperatures and then low temperatures comprising: a metallic lattice formed into the shape of a basket, said lattice comprising a plurality of spaced parallel rods each having enlarged ends, a plurality of transverse frame members positioned slidably on said rods in spaced relation between the ends thereof, and means substantially rigidly spacing said frame members comprising a plurality of coiled wire elements having substantially contiguous erratically aligned convolutions journalled on said rods, there being one coiled wire element positioned on each rod between and in engagement with each pair of adjacent frame members, said coiled wire elements being sufficiently tightly wound that they are substantially incapable of compression due to the contiguity of said convolutions except by some of the convolutions extending partially under adjacent but mis-aligned convolutions, whereby said wire elements provide a rigid spacing between the frame members as they undergo repeated thermal expansion and contraction.

2. A metallic basket for use in heat treating operations in which the basket is periodically subjected to high temperatures and then low temperatures comprising: a rectangular metallic lattice shaped to provide a base and end walls for a basket, said lattice comprising a plurality of spaced parallel rods, a plurality of frame members arranged in spaced relation transverse to said rods, each said frame member having a plurality of apertures therein through which said rods project, the opposite ends of said rods being upset so as to retain the frame members thereon, and means substantially rigidly spacing said frame members comprising a plurality of coiled wire elements having substantially contiguous erratically aligned convolutions journalled on said rods, there being one coiled wire element positioned on each rod between and in engagement with each pair of adjacent frame members, said coiled wire elements being sufficiently tightly wound that they are substantially incapable of compression due to the contiguity of said convolutions except by some of the convolutions extending partially under adjacent but mis-aligned convolutions, whereby said wire elements provide rigid spacing between the frame members as they undergo repeated thermal expansion and contraction.

3. A metallic heat treating basket comprising: a plurality of spaced frame members arranged in parallel relation, each having a plurality of apertures therein, a plurality of spaced transverse rods passing through the apertures in said frame members, said frame members and said rods forming a rectangular lattice structure, the opposite ends of said rods being upset to thereby secure said rods non-removably to said frame members, and means substantially rigidly spacing said frame members comprising a plurality of coiled wire elements having substantially contiguous erratically aligned convolutions journalled on said rods, there being one coiled wire element positioned on each rod between and in engagement with each pair of adjacent frame members, said coiled wire elements being sufficiently tightly wound that they are substantially incapable of compression due to the contiguity of said convolutions except by some of the convolutions extending partially under adjacent but mis-aligned convolutions, whereby said wire elements provide a rigid spacing between the frame members as they undergo repeated thermal expansion and contraction.

References Cited in the file of this patent
UNITED STATES PATENTS

| | | |
|---|---|---|
| 1,266,745 | Wundrack | May 21, 1918 |
| 2,420,428 | Hill et al. | May 13, 1947 |
| 2,601,935 | Auch | July 1, 1952 |
| 2,807,454 | Beadle | Sept. 24, 1957 |